United States Patent Office

3,576,768
Patented Apr. 27, 1971

3,576,768
NOVEL ALUMINA HYDRATE, A NOVEL ALUMINA OBTAINED FROM THE ALUMINA HYDRATE, A CATALYST CONTAINING THE NOVEL ALUMINA AND THE METHOD OF PREPARING THE SAME
William L. Kehl, Indiana Township, and Meredith M. Stewart, Penn Hills Township, Pa., assignors to Gulf Research & Development Company, Pittsburgh, Pa.
No Drawing. Continuation of application Ser. No. 392,051, Aug. 25, 1964. This application Oct. 29, 1969, Ser. No. 871,742
The portion of the term of the patent subsequent to Oct. 6, 1981, has been disclaimed
Int. Cl. B01j 11/06, 11/32
U.S. Cl. 252—465
11 Claims

ABSTRACT OF THE DISCLOSURE

A novel alumina hydrate obtained by hydrothermally treating a crystalline alumina hydrate containing from 1.2 to 2.6 mols of water of hydration. The hydrothermal treatment is conducted by heating the crystalline alumina hydrate in the presence of water at a temperature in the range from 225° to 700° F. and sufficient to vaporize the water under autogenous pressure and thereafter drying the hydrothermally treated crystalline alumina hydrate. A novel alumina is obtained from the hydrothermally treated alumina hydrate by calcining such material.

---

This application is a continuation of Ser. No. 392,051, filed Aug. 25, 1964, and now abandoned.

Our invention relates to a novel alumina and to the method of its preparation.

As the art is well aware various types of aluminas, i.e. aluminum oxides, can be obtained by calcining different kinds of alumina hydrates which can be obtained in a variety of different ways. The art is also well aware of the various uses which such aluminas have in industry such as for example, an adsorbent, a catalyst for dehydrogenating paraffins, a catalyst for isomerizing olefins, a cracking catalyst when combined with silica, a support for reforming catalysts and a support for metallic hydrogenating and dehydrogenating catalysts.

In accordance with our invention we provide a novel alumina suitable for such employment and also a method for preparing the novel alumina. The novel alumina of our invention can be described as having less than 5 percent of its pore volume that is in the form of pores having a radius of 0 to 300 A. in pores larger than 100 A. radius and having less than 10 percent of said pore volume in pores larger than 80 A. radius. This activated alumina is prepared by treating a substance which is predominantly composed of a crystalline alumina hydrate containing from 1.2 to 2.6 mols of water of hydration and which is substantially free of alumina monohydrate and alumina trihydrate; the alumina hydrate being prepared by precipitation from a solution of an aluminum compound at a pH between 7 and 12, and drying to the abovementioned water of hydration content prior to substantial transformation to an alumina hydrate having a higher or lower water of hydration content. The dried alumina hydrate is then hydrothermally treated by heating it in the presence of water in an autoclave at a temperature sufficient to vaporize the water and under the pressure generated in the autoclave at that temperature. This is followed by drying the hydrothermally treated alumina hydrate to provide a novel alumina hydrate which upon calcining yields the activated alumina of our invention.

As indicated, the activated alumina of our invention is obtained by drying and calcining an alumina hydrate derived from the hydrothermal treatment of a material predominantly composed by a crystalline alumina hydrate containing from 1.2 to 2.6 mols of water of hydration and which is substantially free of alumina monohydrate and alumina trihydrate. Any aluminum salt may be employed in preparing this alumina hydrate containing 1.2 to 2.6 mols of water of hydration. For instance aluminum nitrate, chloride, acetate, formate, fluoride, sulfate, and other salts of aluminum may be used. Also a variety of bases such as sodium hydroxide, ammonium hydroxide, potassium hydroxide, etc. may be employed to precipitate the alumina hydrate. However, we prefer to employ salts of aluminum and bases which do not give reaction by-products or salts which are difficult to separate from the desired alumina hydrate. For instance, if aluminum sulfate and/or sodium hydroxide are employed or even if aluminum sulfate and ammonium hydroxide are employed, sulfate salts are formed which are difficult to remove by water washing. On the other hand, if aluminum nitrate, aluminum chloride or an aluminum salt of an organic acid is used and a base such as ammonium hydroxide is employed, the salts which are formed are readily soluble in water and can be easily removed by water washing of the alumina hydrate. For the above reasons potassium and sodium hydroxide are considered to be of little value as compared with aqueous ammonia. Regardless of the specific aluminum salt and base that are used, the final product should be substantially free of such salts. Because of ease in removing salts we prefer to use aluminum nitrate or chloride and neutralize with ammonium hydroxide.

The utilization of a pH between 7 and 12 is essential in order to obtain the particular alumina hydrate utilized in our invention. In other words, the use of a pH above or below this range results in formation of large amounts of undesirable alumina hydrates containing higher and/or lower quantities of water of hydration than 1.2 to 2.6 mols per mol of $Al_2O_3$. Also, care must be employed at all times during the neutralization to avoid a localized higher or lower pH. If a local pH above or below this value exists at any time, a less satisfactory form of alumina hydrate having a different water of hydration content will be formed in this local region. This less satisfactory form will dilute the desired form and will reduce its value to a degree greater than to be expected from the amount which is present. For this reason, it is desirable to utilize a basic solution having the desired pH between 7 and 12 and to add the aluminum salt in small amounts, preferably an aqueous solution thereof, to the basic solution with rapid agitation. If this expedient is used, the resultant alumina hydrate is unlikely to be precipitated even in local regions at a pH below 7 or greater than 12. A pH of 7–8.5 is advantageous since in many cases it gives a higher yield and a more active product. Stoichiometric amounts of the aluminum salt and base are advantageously used. We also prefer to use solutions of both base and aluminum salt which are either dilute or of moderate concentration, such as between about one and 20 percent aluminum salt and between about one and 20 percent of basic solution. However, higher or lower concentrations can be used. The alumina hydrate thus formed is separated from the aqueous mixture by filtration, centrifuging decanting, or any other suitable method. Washing to remove salts as described above is advantageous and is necessary if the salt is not readily volatilized during the subsequent treatment.

This separated alumina hydrate still contains entrained, adherent or mechanically held water, and it must be dried to remove this water before a stable product is obtained. Even though the desired form of alumina hydrate is initially prepared, it is unstable and may undergo transformation during the process of precipitation, separation and/or drying and it is necessary to observe certain precautions to avoid this harmful transformation. Therefore, before giving details on the drying procedure, it would be best to consider procedures which may be employed to avoid this harmful transformation, particularly during the process of neutralization and precipitation.

One method for avoiding this harmful transformation is to use elevated temperatures such as above about 170° F. These elevated temperatures reduce or prevent the undesirable transformation of the alumina hydrate into one having a lower or higher water of hydration content. However, for these temperatures to have these beneficial effects, they should be maintained throughout the above-mentioned precipitation and washing steps and until the drying is completed. Generally, the temperature should be kept as close to 170° F. as is convenient but if a temperature in the range of 200° F. or slightly above is employed, the residence time should be reduced accordingly. This specific mode of preparing alumina hydrate of 1.2 to 2.6 mols of water of hydration content is the subject of our U.S. application Ser. No. 118,240, filed June 20, 1961 now U.S. Pat. No. 3,188,174.

According to another method of avoiding the transformation into less desirable forms the precipitation and drying are carried out with promptness. Thus the time required for the transformation to take place is such that the entire precipitating and drying operations can be carried out even with relatively large or commercial quantities if care is taken to do so expeditiously. Ordinarily formation and drying should take place within a period of at most 24 hours and preferably within about 4 to 8 hours or less when this expedient is used. It is especially advantageous to use a pH of 7–8.5 in connection with this particular method.

The undesirable transformation can be avoided by other methods of preparation. For instance, the presence of acetate ion greatly delays the transformation even at ordinary temperatures. Also buffered precipitating solutions may be used. These expedients are the subject matter of our applications Ser. No. 118,279, filed June 20, 1961 now U.S. Pat. No. 3,151,940 and Ser. No. 118,241, filed June 20, 1961, now U.S. Pat. No. 3,151,939.

The drying of this alumina hydrate may be carried out in any desired manner so long as it is completed prior to the harmful transformation. As may be gathered from the above described procedures for avoiding the transformation, a temperature of above 170° F. will prevent the transformation from taking place. Therefore it is advantageous to employ temperatures at least as high as this for drying. The drying may be carried out in vacuum if desired. It, of course, follows that considerably higher temperatures than 170° F. may be employed. For instance, it is entirely satisfactory to utilize temperatures such as 212° F. or even 250° F. This drying removes the mechanically held water and yields a stable product. It is predominantly composed of the desired crystalline alumina hydrate containing 1.2 to 2.6 mols of water of hydration and is substantially free of alumina monohydrate and alumina trihydrate.

After drying, this alumina hydrate is subjected to hydrothermal treatment by placing the alumina hydrate together with water in a sealed vessel, such as an autoclave, and heating at an elevated temperature for a period of time. Generally, the quantity of water employed is sufficient to immerse completely the dried alumina hydrate. The sealed vessel is then heated so as to raise the temperature gradually over a period of time, such as, for example, about 2 to 8 hours, and the temperature is then maintained at an elevated level from about 225° or 250° F. up to about 500° F. or 700° F., in any event a temperature adequate to provide sufficient water vapor pressure to prevent dehydration of the alumina hydrate, for a period from a few minutes up to several hours, for example, from 2 or 3 minutes up to 8 or 16 hours. We have found that the roles of time and temperature in the hydrothermal treatment in accordance with our invention are to a considerable extent interchangeable. Thus, one might by suitably extending the duration of treatment produce the desired conversion at a low temperature which would be essentially the same as that obtained in a shorter period of time employing a higher temperature. For example, employing a temperature of 250–350° F. for a period of 4 hours is usually sufficient to bring about substantially complete conversion, while treatment at a lower temperature for the same period of time effects a partial conversion and yet treatment at a lower temperature for a longer period can usually effect substantially complete conversion. Accordingly, by gradually raising the temperature of the autoclave from room temperature up to about 325° or 350° F. over a period of 4 hours and then maintaining the temperature at that level for an additional four hours, resulting in a total processing time of 8 hours, substantially complete conversion can be effected. A certain degree of caution, however, must be exercised, since the employment of too high a temperature for a particular length of time of treatment will destroy the desired unique pore structure of the product. For example, the employment of a temperature from about 250° F. up to about 325° or 350° F. for a period of four hours will produce an alumina hydrate which upon calcination provides an alumina having the desired pore structure consisting of pores of less than 300 A. radius with less than 5 percent of its pore volume in pores larger than 100 A. and less than 10 percent of its pore volume in pores larger than 80 A., while the employment of a temperature much above about 350° F. results in a final alumina having a pore size distribution somewhat outside this range. The employment of a temperature of 400° F. for a treatment period of four hours so completely destroys the structure that it has about 30 percent of its pore volume in pores larger than 100 A. and about 50 percent of its pore volume in pores larger than 80 A. It is believed that the heating permits the metastable dried alumina hydrate which we hydrothermally treat to rearrange to a stable form of alumina hydrate while the water pressure prevents dehydration of the alumina hydrate to alumina. Accordingly, we believe that any water vapor pressure above the dehydration pressure of the dried alumina hydrate at the particular temperature selected is adequate for the hydrothermal treatment in accordance with our invention. We prefer, however, to employ an excess of pressure obtained by employing a quantity of water in excess of the minimum required as a safety precaution, thereby insuring that the minimum required water vapor pressure is present. Generally, the pressure will be in the range from about 30 to about 700 p.s.i.g., although it can vary from a low of 10 p.s.i.g., at 200° F. to a high of 3100 p.s.i.g. at 700° F. The employment of a slight excess of water vapor pressure in the hydrothermal processing of our invention has no deleterious effects upon the conversion or the product hydrothermally treated alumina hydrate.

The hydrothermally treated alumina hydrate of our invention is substantially a monohydrate which can be described as a less well crystallized boehmite having crystallites of an extremely small diameter. Thus, commercially available boehmites and boehmites obtained, for instance, by hydrothermal treatment of a trihydrate have an average crystallite diameter in the range from about 1200 or 1300 A. up to about 2000 A. or above, while the average crystallite diameter of the hydrothermally treated alumina hydrate of our invention is about 100 A. The hydrothermally treated alumina hydrate of our invention also has a water of hydration content approximately the same as the monohydrate boehmite.

At the completion of this treatment the hydrothermally treated alumina hydrate is then dried and calcined to obtain the activated alumina of our invention. Any conventional method heretofore used for calcining a dried alumina can be employed. However, a temperature above about 1600° F. should not be used since such elevated temperatures cause deactivation of the activated alumina. A temperature of between about 800° F. and 1200° F. ordinarily is satisfactory. A calcining time of between about 2 and 24 hours ordinarily will be satisfactory. In most cases the shorter time periods will be used with the higher temperatures and the longer periods with the lower temperatures. The final product is opaque, hard and glassy. It has a unique pore structure and is $Al_2O_3$ which still contains a small amount of water—usually less than about 3 percent.

The unique pore structure of our alumina, probably one of its most distinctive features, can be characterized as including a substantial, usually a predominant, portion of the total pores and consisting of pores less than 300 A. radius having the particular pore size distribution described previously. For example, a similar alumina has been found to be composed almost entirely of pores less than 300 A. radius, which pores comprise more than 90 percent of the total pore volume.

The novel activated alumina of our invention can be employed directly as an adsorbent or as a catalyst for the dehydration of paraffins or the isomerization of olefins. The alumina of our invention can also be combined with silica for catalytic purposes by impregnation of the alumina after calcination or by combination with the alumina hydrate prior to calcination. Similarly our alumina can be employed as a support for other catalytic components. For example, if it is desired to use our alumina as the support for a metalliferous hydrogenating component any of the conventional procedures for preparation of such a two-component catalyst may be used. Ordinarily we prefer to impregnate the activated alumina carrier with an aqueous solution of a salt of the metalliferous hydrogenating catalyst and then dry and calcine to obtain the finished hydrogenation catalyst. Any hydrogenating component such as Group VIII or Group VI metal oxides or sulfides, such as molybdenum or tungsten oxides and sulfides or nickel or cobalt metals, oxides or sulfides may be used. It is frequently desirable to employ mixtures of these catalysts such as cobalt-molybdenum, nickel-cobalt-molybdenum, nickel-tungsten, etc., their oxides or sulfides. A particularly desirable catalyst is a mixture of oxides of nickel, cobalt and molybdenum such as described in U.S. Pat. 2,880,171, Mar. 31, 1959, Flinn et al.

In order to illustrate our invention in greater detail, reference is made to the following examples:

EXAMPLE I

A 4730 gram quantity of aluminum chloride

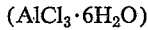

was dissolved in 20 liters of water and 500 grams of glacial acetic acid was then added to the solution. In another vessel 2000 milliliters of ammonium hydroxide (28% $NH_3$) was mixed with 5000 milliliters of water, and this solution was then added to the aluminum chloride solution until a pH of 8 was obtained. The slurry formed from mixing the two solutions was filtered and washed on the cake until the conductivity of the wash water lined out indicating that the washing was complete. The wet filter cake was then dried at 250° F. for 16 hours to provide an alumina hydrate containing from 1.2 to 2.6 mols of water of hydration. A 500 gram sample of this alumina hydrate was charged to an autoclave with 500 milliliters of distilled water and heated to 350° F. in four hours and maintained at that temperature for an additional four hours under the pressure generated by the water vapor. The material from the autoclave was filtered and the hydrothermally treated alumina hydrate was dried at 250° F., sized to 10–20 mesh and calcined at 1000° F. for 16 hours to provide the alumina of our invention. The physical characteristics of the alumina of our invention are set forth in Table I below.

TABLE I

| | $Al_2O_3$ of this invention |
|---|---|
| Surface area: m.²/g. | 170 |
| Pore volume: cc./g. | 0.37 |
| Avg. pore radius (2 v./A.): A. | 43.8 |
| Tap density: g./cc. | 0.89 |
| Pore size distribution, percent pore vol. in range, A: | |
| 200–300 | 0.6 |
| 100–200 | 2.2 |
| 80–100 | 6.8 |
| 60–80 | 28.6 |
| 50–60 | 11.5 |
| 40–50 | 20.0 |
| 30–40 | 16.1 |
| 20–30 | 12.9 |
| 15–20 | 1.2 |
| 10–15 | 0.0 |
| 0–10 | 0.0 |
| >100 | 2.8 |
| > 80 | 9.6 |

The pore size distribution shown in Table I was determined by the technique of nitrogen adsorption and desorption isotherms described in the article by Ballou and Doolen in Analytical Chemistry, volume 32, page 532, April 1960.

From the above table it will be seen that the alumina of our invention has a unique pore structure containing extremely fine pores. Specifically, this alumina has only 2.8 percent of its pore volume in pores larger than 100 A. radius and only 9.6 percent of its pore volume in pores larger than 80 A. radius.

EXAMPLE II

In this example an alumina derived from a hydrothermally treated alumina hydrate, obtained in accordance with the procedure described in Example I, was impregnated with nickel to provide a catalyst containing 5 percent nickel supported on the alumina of our invention. This catalyst was employed in the hydrogenation of tetralin (1,2,3,4-tetrahydronaphthalene) to produce decalin (decahydronaphthalene) under operating conditions including a temperature of 500° F., a pressure of 750 p.s.i.g., a space velocity of 10 volumes of charge per volume of catalyst per hour and a hydrogen feed rate of 10,000 standard cubic feet per barrel of charge. The conversion obtained in this example was 15.8 percent computed on the basis of the percent of aromatic components in the feed which were saturated. Use of a lower space velocity in the process of this example will, of course, provide a higher conversion.

We claim:
1. In the preparation of an alumina hydrate having an average crystallite diameter of about 100 A. from a crystalline alumina hydrate containing from 1.2 to 2.6 mols of water of hydration and which is substantially free of alumina monohydrate and alumina trihydrate, said crystalline alumina hydrate being prepared by precipitation from a solution of an aluminum compound at a pH between 7 and 12, and drying to the above specified water of hydration content prior to substantial transformation to an alumina hydrate having a water of hydration content other than the above specified water of hydration content, the method which comprises hydrothermally treating the crystalline alumina hydrate by heating it in the presence of water at a temperature in the range from about 225° to about 700° F. sufficient to vaporize the water under autogenous pressure and then drying the hydrothermally treated crystalline alumina hydrate.

2. The method of claim 1 wherein the duration of the hydrothermal treatment is from about 2 minutes to about 16 hours.

3. The method of claim 1 wherein the temperature employed in the hydrothermal treatment is from about 250° to about 350° F., and the duration of such treatment is about 4 hours.

4. The method of claim 1 wherein the pressure is from about 30 to about 700 p.s.i.g 5. An alumina hydrate having an average crystallite diameter of about 100 A. prepared from a crystalline alumina hydrate containing from 1.2 to 2.6 mols of water of hydration and which is substantially free of alumina monohydrate and alumina trihydrate, said crystalline alumina hydrate containing 1.2 to 2.6 mols of water of hydration beting prepared by precipitation from a solution of an aluminum compound at a pH between 7 and 12, and drying to the above specified water of hydration content prior to substantial transformation to an alumina hydrate having a water of hydration content other than the above specified water of hydration content, by hydrothermally treating the crystalline alumina hydrate by heating it in the presence of water at a temperature in the range from about 225° to about 700° F. sufficient to vaporize the water under autogenous pressure, and drying the hydrothermally treated crystalline alumina hydrate.

6. In the preparation of an activated alumina having less than 5 percent of its pore volume that is in the form of pores having a radius from 0 to 300 A. in pores larger than 100 A. radius and having less than 10 percent of said pore volume in pores larger than 80 A. radius from a crystalline alumina hydrate containing from 1.2 to 2.6 mols of water of hydration and which is substantially free of alumina monohydrate and alumina trihydrate, said crystalline alumina hydrate being obtained by precipitation from a solution of an aluminum compound at a pH between 7 and 12, and drying to the above specified water of hydration content prior to substantial transformation to an alumina hydrate having a water of hydration content other than the above specified water of hydration content, the method which comprises hydrothermally treating the crystalline alumina hydrate by heating it in the presence of water at a temperature in the range from about 225° to about 700° F. sufficient to vaporize the water under autogenous pressure, and drying and calcining the hydrothermally treated crystalline alumina hydrate at a temperature less than about 1600° F.

7. The method of claim 6 wherein the duration of the hydrothermal treatment is from about 2 minutes to about 16 hours.

8. The method of claim 6 wherein the temperature employed in the hydrothermal treatment is from about 250° to about 350° F., and the duration of such treatment is about 4 hours.

9. The method of claim 6 wherein the pressure is from about 30 to about 700 p.s.i.g.

10. An alumina having less than 5 percent of its pore volume that is in the form of pores having a radius of 0 to 300 A. in pores larger than 100 A. radius and less than 10 percent of said pore volume in pores larger than 80 A. radius prepared from a crystalline alumina hydrate containing from 1.2 to 2.6 mols of water of hydration and which is substantially free of alumina monohydrate and alumina trihydrate, said crystalline alumina hydrate being prepared by precipitation from a solution of an aluminum compound at a pH between 7 and 12, and drying to the above specified water of hydration content prior to substantial transformation to an alumina hydrate having a water of hydration content other than the above specified water of hydration content, by hydrothermally treating the crystalline alumina hydrate by heating it in the presence of water of a temperature in the range from about 225° to about 700° F. sufficient to vaporize the water under autogenous pressure, and drying and calcining the hydrothermally treated crystalline alumina hydrate at a temperature less than about 1600° F.

11. A catalyst composition consisting essentially of a minor amount of a metalliferous catalytic component selected from the group consisting of Groups VI and VIII metals, their oxides and sulfides composited with a major amount of an activated alumina having less than 5 percent of its pore volume that is in the form of pores having a radius of 0 to 300 A. in pores larger than 100 A. radius and having less than 10 percent of said pore volume in pores larger than 80 A. radius prepared from a crystalline alumina hydrate containing from 1.2 to 2.6 mols of water of hydration and which is substantially free of alumina monohydrate and alumina trihydrate, said crystalline alumina hydrate being prepared by precipitation from a solution of an aluminum compound at a pH between 7 and 12, and drying to the above specified water of hydration content prior to substantial transformation to an alumina hydrate having a water of hydration content other than the above specified water of hydration content, by hydrothermally treating the crystalline alumina hydrate by heating it in the presence of water at a temperature in the range from about 225° to about 700° F. sufficient to vaporize the water under autogenous pressure, and drying and calcining the hydrothermally treated crystalline alumina hydrate at a temperature less than about 1600° F.

References Cited

UNITED STATES PATENTS

| | | | |
|---|---|---|---|
| 2,378,155 | 6/1945 | Newsome et al. | 252—463 |
| 3,151,940 | 10/1964 | Kehl et al. | 252—463 |
| 3,162,606 | 12/1964 | Giraitis et al. | 252—466 |
| 3,193,348 | 7/1965 | Mooi | 252—466 |
| 3,245,919 | 4/1966 | Gring et al. | 252—466 |
| 3,264,061 | 8/1966 | Kehl et al. | 23—143 |

DANIEL E. WYMAN, Primary Examiner

P. M. FRENCH, Assistant Examiner

U.S. Cl. X.R.

252—463, 466